Patented July 20, 1937

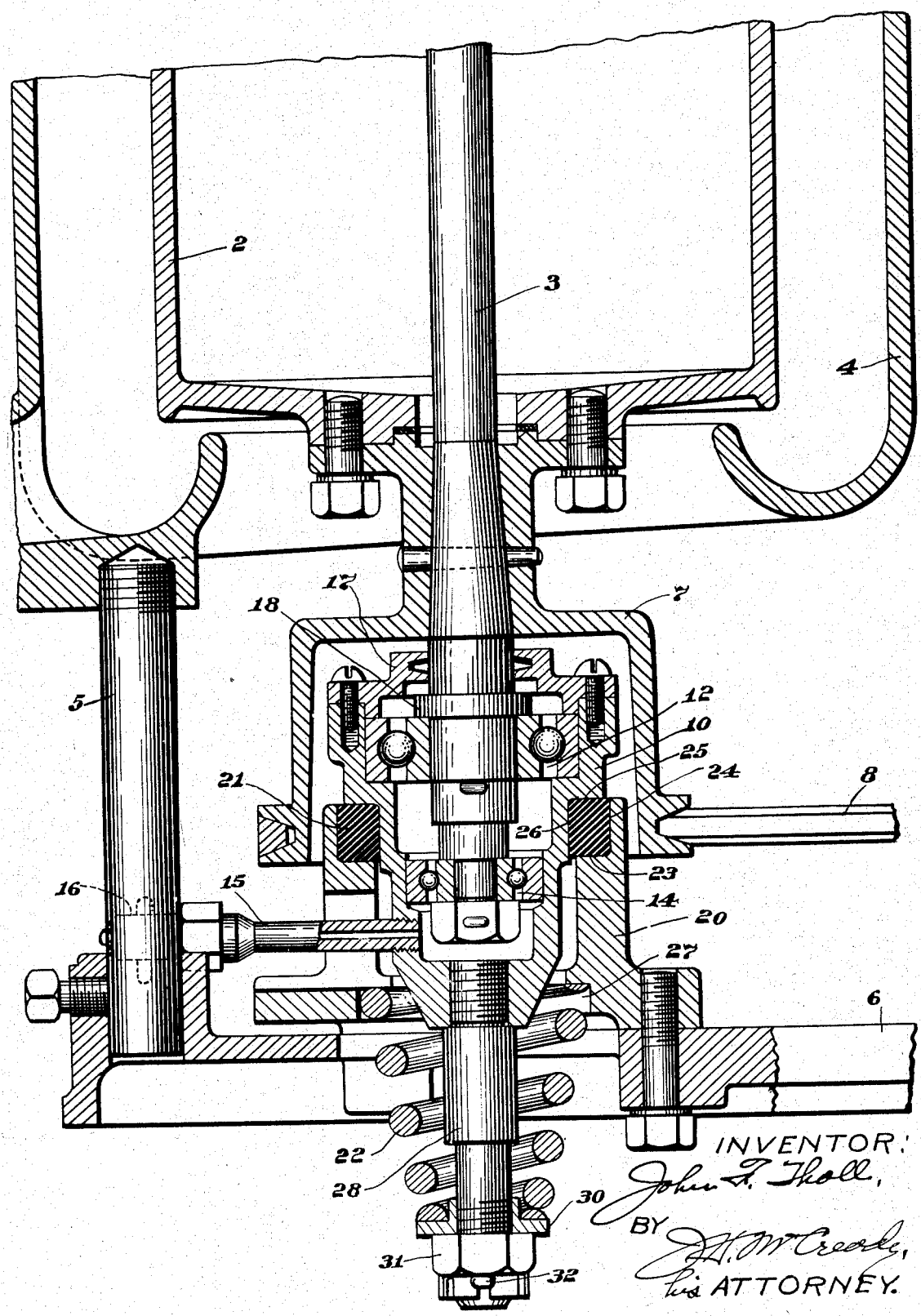

2,087,848

UNITED STATES PATENT OFFICE 2,087,848

CENTRIFUGAL SEPARATOR

John F. Tholl, Needham, Mass., assignor to American Tool & Machine Co., Hyde Park, Mass., a corporation of Massachusetts Application March 7, 1934, Serial No. 714,461

5 Claims. (Cl. 308—145)

This invention relates to centrifugal separators and is more especially concerned with the bearing mechanisms for supporting the spindles of machines of this type, particularly those in which the bearing is located below the basket.

When any centrifugal separator of this general type is started up under load it goes through a critical speed at which it vibrates badly and usually arrives later, as its speed is increased, to a smooth running condition. This is not always the case, however, particularly when the load carried by the spindle is badly unbalanced. Apparently the excessive vibration of the spindle at its critical speed is caused by a conflict between those forces tending to compel the spindle to revolve about its own axis and other forces tending to make the spindle rotate about an axis passing through the center of gravity of the entire rotating mass, including the spindle, the basket, and the load carried by the basket. So long as one set of forces or the other is in definite control of the situation, a smooth running condition is maintained, but when the two are more nearly equal, and neither is in definite control, then an unstable running condition exists and excessive vibration occurs. This problem is exceptionally troublesome in small high speed machines. To devise a thoroughly practical solution for it forms the chief object of the present invention.

The nature of the invention will be readily understood from the following description when read in connection with the accompanying drawing, and the novel features will be particularly pointed out in the appended claims.

The single figure of the accompanying drawing is a vertical, sectional view of portions of a centrifugal separator, and illustrates more particularly a bearing mechanism constructed in accordance with this invention.

The construction shown in the drawing comprises a basket 2 mounted on a vertical spindle 3 and enclosed in a suitable curb or casing 4. A post 5 supports the curb, and is itself supported in the base 6 of the machine. Mounted on the spindle 3 is a pulley 7 grooved to receive a driving belt 8 by means of which it may be operatively connected with a motor or any other convenient source of power.

The bearing structure comprises a bearing cup 10 of stepped formation, both internally and externally, and upper and lower bearings 12 and 14, respectively, preferably of the ball type, for operatively supporting the spindle 3. Oil or grease may be introduced into the cup through a tube 15 equipped with an Alemite fitting 16 in order to keep the bearing elements properly lubricated, and a cap 17 removably secured to the upper end of the cup substantially confines the lubricant in the cup, this cap being provided with suitable oil retaining flanges to cooperate with the oil throwing ring 18 on the spindle.

This bearing structure is supported in a mounting which comprises an upright bearing bracket 20, resting on and rigidly secured to the base 6, a bushing 21 made of rubber or other resilient material seated in the upper end of the bracket, and a coiled spring 22 which serves to hold the bearing structure yieldingly in the desired position. It will be observed that the rubber bushing 21 rests on an internal shoulder 23 on the bracket 20 and is laterally confined by a circular wall 24 engaging the periphery of the bushing. The bearing cup is provided with corresponding parts, these parts comprising a horizontal shoulder 25 to rest on the bushing and a cylindrical surface 26 on which the bushing fits snugly. Consequently, this bushing tends, due to its inherent resiliency and to the mounting just described, to hold the bearing cup yieldingly in a centered position.

Cooperating with the bushing 21 is a spring 22 which preferably is of a tapered coiled form and is supported in an inverted position with its upper larger end located in a recess 27 formed in the bottom of the stationary bearing bracket 20, and its smaller lower end bearing against a head secured on the lower end of a stem 28 which extends downwardly from the bearing cup 10, is rigid therewith, and is substantially co-axial with the spindle 3. The head structure consists of an angular collar 30 on which the lower end of the spring 22 bears, and a nut 31 threaded on the lower end of the stem and secured against rotation by a cotter pin 32.

As above stated, the rubber bushing 21 serves both to support the weight of the spindle and the parts mounted on it, and also to center the bearing cup 10. The action of this bushing, however, is yielding or elastic due to the nature of the material of which it is composed. The spring 22 serves both to hold the bearing cup firmly seated on the bushing 21 and it also exerts a yielding centering or aligning action on the stem 28, and consequently on the bearing cup and the parts supported by it. As the spindle is brought up to speed it rotates for a time about the axis of the spindle 3. If, however, unbalancing factors are present, the forces tending to make this spindle revolve around an axis passing through the center of gravity of the entire rotating mass, will shortly make themselves felt as the speed is increased. This will produce some vibration of the spindle as it passes through the critical speed, but the bearing mechanism is such that these forces shortly will overcome those tending to compel rotation around the axis of the spindle, and thereafter a smooth running condition will obtain in which the spindle will revolve around an axis passing through the center of mass. Such a shift in control from the first set of forces to the second is permitted by this bearing so that the critical speed, or the range in which the spindle vibrates, is relatively narrow and the spindle runs smoothly at operating speeds notwithstanding a badly unbalanced load. Exactly what occurs in the shift from one set of conditions to the other is difficult to determine. It seems probable, however, that at a normal running speed the basket, in addition to revolving around the axis of the spindle 3, has a slight gyratory motion in which said axis rotates around the center of mass, or takes some intermediate position in which the forces are substantially balanced. But whatever the explanation may be, it has been definitely determined in practice that this mechanism affords the desired smooth running conditions even with loads definitely out of balance.

The centering or aligning action of the spring 22 may perhaps be better understood if it is pointed out that if the center of mass of the basket and its load is eccentrically disposed, it will tend to produce a lateral or angular displacement of the spindle due to the fact that it is located considerably above the point of support of the spindle. The bushing 21 prevents any substantial lateral displacement of the spindle at the portion of the bearing cup in horizontal alinement with said bushing. Horizontal displacement of the lower end of the stem 28 is resisted strongly, but yieldingly, by the spring 22, this spring thus supplying a force tending to hold the stem constantly in alinement with the bearing bracket. In addition, the downward pressure exerted by the spring 22 through the bearing cup on the rubber bushing 21 serves to hold this bushing under a considerable degree of vertical compression and thus adds to the resistance afforded by the bushing itself to that distortion which would be produced in it by forces tending to displace the cup horizontally in the plane of the bushing. Thus two restoring forces operate on the spindle bearing tending to resist displacement of it by the load, one being produced by the bushing 26 and the other by the spring 22, and the latter cooperating with the former to increase or reinforce the action of the former.

While I have herein shown and described a preferred embodiment of my invention, it will be understood that the invention is not limited to embodiment in the precise form shown.

Having thus described my invention, what I desire to claim as new is:

1. In a centrifugal separator, the combination with a basket, an upright spindle below said basket and on which said basket is mounted, and a bearing structure for supporting said spindle, of a mounting for said bearing including a bushing of resilient material on which said structure is seated, and a coiled spring located substantially co-axially with said spindle and connected with said bearing structure to press it downwardly against said bushing, said spring being so associated with said structure as to exert a centering action on said spindle.

2. In a centrifugal separator, the combination with a basket, an upright spindle below said basket and on which said basket is mounted, and a bearing structure for supporting said spindle, of a mounting for said bearing including a bushing of resilient material on which said structure is seated, said structure having a stem rigid therewith and projecting downwardly therefrom and substantially co-axial with said spindle, and a coiled tapered spring encircling said stem and abutting at its larger end against a stationary part of the machine and bearing at its smaller end against the lower end of said stem where it exerts a downward thrust on said stem and said bearing structure tending to hold said structure seated on said bushing.

3. In a centrifugal separator, the combination with a basket and an upright spindle on which said basket is mounted, of a bearing structure for supporting said spindle comprising a bearing cup and bearings in said cup for supporting said spindle, an upright bearing bracket, a rubber bushing supported in said bracket and encircling said cup, said cup being seated on said bushing at an intermediate point in the length of the cup, a stem rigid with and projecting downwardly from said cup in a substantially co-axial relationship to said spindle and provided with a head at its lower end, and an inverted tapered coiled spring having its smaller end bearing against said head and its upper end backed up by a stationary part of the machine, whereby it serves both to press said cup downwardly upon said bushing and to yieldingly center said spindle.

4. In a centrifugal separator, the combination with a basket and an upright spindle on which said basket is mounted, of a bearing structure for supporting said spindle comprising a bearing cup and anti-friction bearings in said cup for supporting said spindle, an upright bearing bracket, a rubber bushing supported in said bracket and encircling said cup, said cup being seated on said bushing and being supported thereby against substantial movement either downwardly or laterally relatively to said bracket, a stem rigid with said cup and projecting downwardly therefrom in a substantially co-axial relationship to said spindle, a head on the lower end of said spindle, and an inverted tapered coiled spring having its lower end bearing against said head and its upper end backed up by a stationary part of the machine whereby it serves both to press said cup downwardly upon said bushing and to yieldingly center said stem.

5. In a centrifugal separator, the combination with a basket and an upright spindle below said basket and on which said basket is mounted, of a bearing structure for supporting said spindle comprising a bearing cup and bearings in said cup for supporting said spindle, an upright bearing bracket, a rubber bushing seated in said bracket and closely encircling said cup, said cup having a shoulder resting on said bushing, and a spring below said bushing and acting on said cup approximately in line with the axis of said spindle to hold said shoulder downwardly on said bushing.

JOHN F. THOLL.